(12) United States Patent
Straub

(10) Patent No.: US 6,453,736 B1
(45) Date of Patent: Sep. 24, 2002

(54) APPARATUS AND METHOD FOR ROTATIONAL TESTING OF AN OBJECT

(75) Inventor: Albert Michael Straub, Ann Arbor, MI (US)

(73) Assignee: TRW Inc., Lyndhurst, OH (US)

(*) Notice: Subject to any disclaimer, the term of this patent is extended or adjusted under 35 U.S.C. 154(b) by 0 days.

(21) Appl. No.: 09/615,002

(22) Filed: Jul. 12, 2000

(51) Int. Cl.$^7$ ............................................. G01M 17/02
(52) U.S. Cl. ......................................................... 73/146
(58) Field of Search ........................... 73/146, 460–467, 73/450–459, 470–489, 7, 8, 865.3, 866; 248/679

(56) References Cited

U.S. PATENT DOCUMENTS

| | | |
|---|---|---|
| 2,814,944 A | 12/1957 | Brown |
| 3,755,888 A | 9/1973 | Geil |
| 5,033,302 A | 7/1991 | Mönch |
| 5,067,348 A * | 11/1991 | Himmler et al. ............. 73/460 |
| 5,285,189 A | 2/1994 | Nowicki et al. |
| 5,576,496 A * | 11/1996 | Carlini et al. ................. 73/460 |
| 5,652,375 A | 7/1997 | Da Re' |
| 5,844,131 A | 12/1998 | Gabelmann et al. |
| 5,861,544 A | 1/1999 | Kosaraju et al. |
| 6,050,137 A * | 4/2000 | Merrill, Sr. .................. 73/146 |
| 6,131,455 A * | 10/2000 | Matsumoto et al. .......... 73/462 |

* cited by examiner

Primary Examiner—Harshad Patel
(74) Attorney, Agent, or Firm—Tarolli, Sundheim, Covell, Tummino & Szabo L.L.P.

(57) ABSTRACT

An apparatus and method for testing units that are subject to rotational force, such as automotive tire-mounted units. The apparatus (30) includes a rotational drive motor (36), a rotating member (32), and a drive interconnection (42, 44, 46, 48, 50, 56) operatively connected between the drive motor and the rotating member. The drive interconnection includes a first constant velocity joint (44), a longitudinal spline interconnection (56), and a second constant velocity joint (46). The apparatus (30) also includes a stationary motor mount (38) fixed to the drive motor (36), a test unit holder (34) located on the rotating member, and a three-dimensional motion drive (40) operatively connected to the rotating member (32).

20 Claims, 3 Drawing Sheets

APPARATUS AND METHOD FOR ROTATIONAL TESTING OF AN OBJECT

TECHNICAL FIELD

The present invention relates to an apparatus and associated method for testing an object using radial acceleration, and more particularly to an apparatus and method for testing tire-mounted units, such as tire pressure monitoring units.

BACKGROUND OF THE INVENTION

Tire pressure monitoring systems are known in the art. Some examples of tire pressure monitoring systems are disclosed in U.S. Pat. No. 5,285,189 and U.S. Pat. No. 5,844,131.

A tire pressure monitoring system senses inflation pressure within a vehicle tire. The sensory information sensed by the monitoring system is typically displayed to the vehicle operator in some fashion, such as via a digital readout on the vehicle dashboard. To sense the inflation pressure within a tire, typically a portion of the tire pressure monitoring system, such as a monitoring unit, is located in or on the tire. As such, this unit is subjected to rotational force as the tire is rotated. Accordingly, this unit needs to be operable under rotational forces. Devices have been developed to test the operativeness of instruments which are rotated. For instance, U.S. Pat. No. 2,814,944, discloses a centrifugal testing apparatus for subjecting instruments to centrifugal force and to simulate constant or steady state acceleration for test purposes.

The monitoring unit also monitors tire pressure under various operating conditions. For instance, the monitoring unit may monitor the pressure within a tire when the vehicle is driven at various speeds and/or on various road conditions. Additionally, the monitoring unit may monitor the pressure within a tire at different temperatures and surrounding atmospheric pressures. As such, a tire pressure monitoring unit needs to be operable to monitor the pressure within a tire under different operating conditions.

To test the operativeness of a tire pressure monitoring unit under various operating conditions, the vehicle within which the entire monitoring system is integrated can be operated under those conditions. For instance, to test the operativeness of a tire pressure monitoring system at a low atmospheric temperature and a low atmospheric pressure, the vehicle equipped with the monitoring system can be driven in a cold, elevated geographic area, such as on a mountain top. Likewise, to test the operativeness of a tire pressure monitoring system at 150 miles per hour, the vehicle equipped with the monitor can be driven at 150 miles per hour.

For obvious reasons that include, among other things, cost and safety, it is apparent that it would be desirable to be able to test the operativeness of a tire pressure monitoring unit under a variety of operating conditions without having to actually-operate a vehicle under those conditions. Thus, a device that would permit a tire pressure monitoring unit to be tested under a wide variety of operating conditions representative of the conditions under which a vehicle may actually be driven would be desirable.

SUMMARY OF THE INVENTION

The present invention is directed to an apparatus and an associated method for testing units that are to be subjected to rotational force. The units may include automotive tire-mounted units, such as a tire pressure monitoring unit.

According to one aspect of the invention, a testing apparatus includes a rotational drive motor, a rotating member, and a drive interconnection operatively connected between the drive motor and the rotating member. The drive interconnection includes a first constant velocity joint, a longitudinal spline interconnection, and a second constant velocity joint. The apparatus also includes a stationary motor mount fixed to the drive motor, a test unit holder located on the rotating member, and a three-dimensional motion drive operatively connected to the rotating member.

According to another aspect of the invention, a method for testing automotive tire-mounted units includes the steps of locating a test unit on a member, holding the test unit on the member, operatively connecting a drive motor to the member, starting the drive motor, rotating the member with the drive motor, and moving the test unit in three dimensional space without affecting the drive motor.

BRIEF DESCRIPTION OF THE DRAWINGS

The foregoing and other features and advantages of the present invention will become more apparent to one skilled in the art upon consideration of the following description of the invention and the accompanying drawings, wherein.

DESCRIPTION OF AN EXEMPLARY EMBODIMENT

Figure 1:
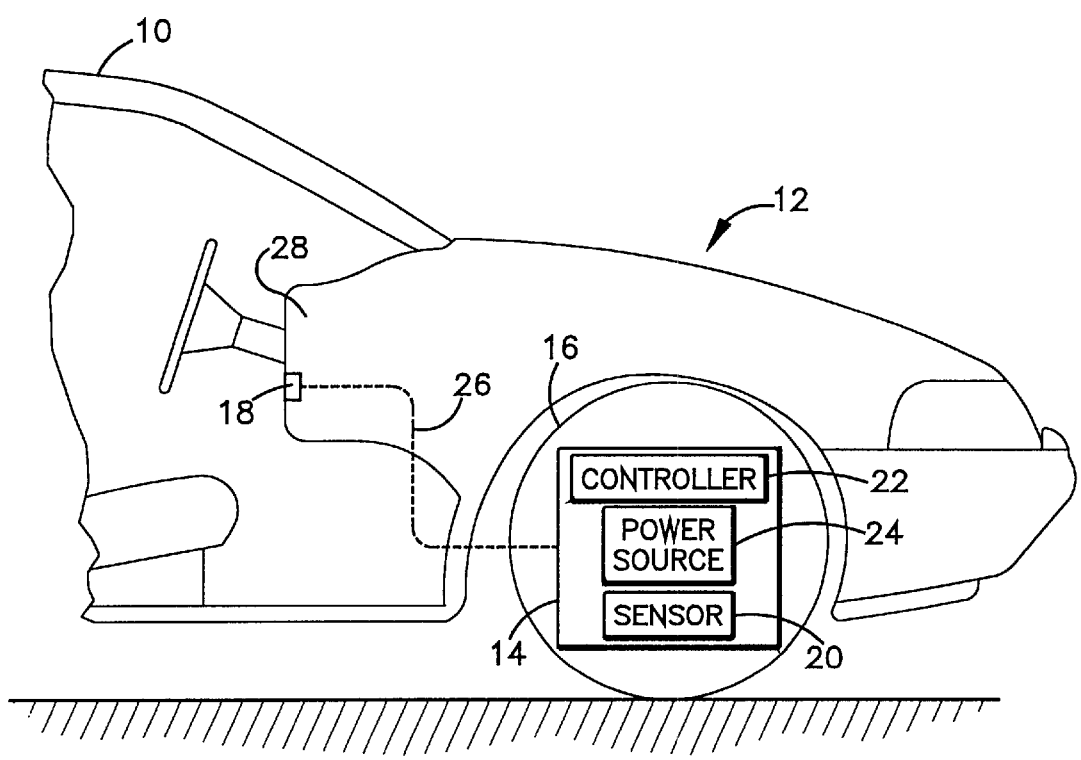
FIG. 1 is a schematic diagram of a vehicle that contains a typical tire pressure monitoring system.

A vehicle 10 is illustrated in FIG. 1 as having a typical tire pressure monitoring system 12. The tire pressure monitoring system 12 includes a monitoring unit 14 located in or on a vehicle tire 16 and a display 18 external to the tire 16. The monitoring unit 14 typically includes a sensor 20, a controller 22, and a power source 24.

The power source 24 provides power for the pressure sensor 20 and the controller 22. The sensor 20 senses inflation pressure or other parameters associated with the tire 16, and the controller 16 (e.g., a microcomputer) controls communication of the sensed pressure, etc. to the display 18 via a communication link 26 (shown in phantom) The communication link 26 may either be a hardwired or a wireless link.

The display 18 displays the sensed pressure, etc. to an operator (not shown) of the vehicle 10. The display 18 may continuously or periodically display the sensed pressure within the vehicle tire 16. The display 18 may be located on the vehicle dash 28 or other conspicuous location within the vehicle 10. The display 18 may be a visual and/or audio display. In one example, the visual display may be an LED or LCD display. In another example, the audio display may be a speaker that provides an audible indication when the tire pressure drops below a predetermined level.

As mentioned above, it is to be appreciated that the monitoring unit 14 is subject to certain conditions during operation. Specifically, the monitoring unit 14 is subject to rotation and radial acceleration because of the location within the tire. The monitoring unit 14 may be subject to a wide range of temperatures depending upon driving locations and conditions of the vehicle. Also, the monitoring unit 14 is subject to a great deal of three dimensional motion due to road surface conditions.

Figure 2:
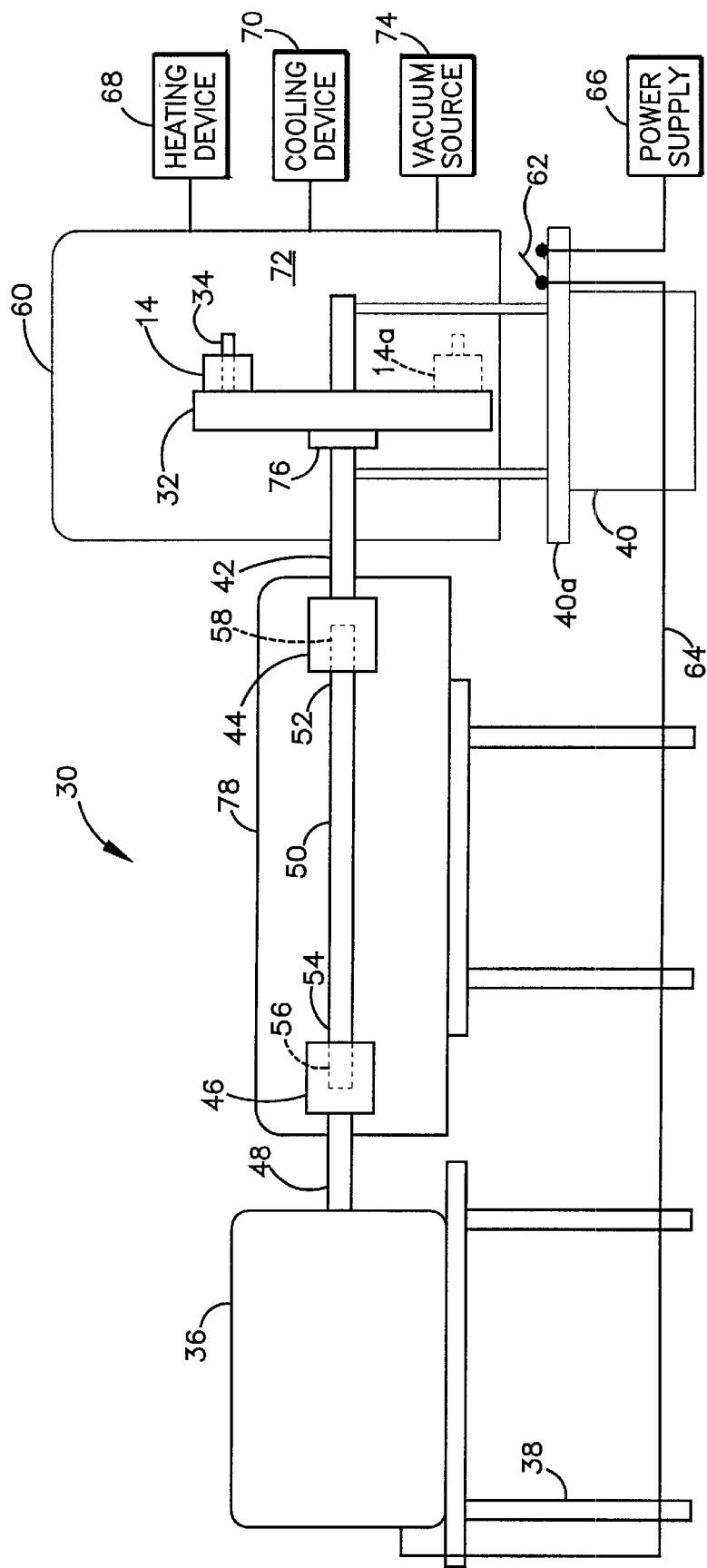
FIG. 2 is a side view of a testing apparatus in accordance with the present invention in an inactive state.
Figure 3:
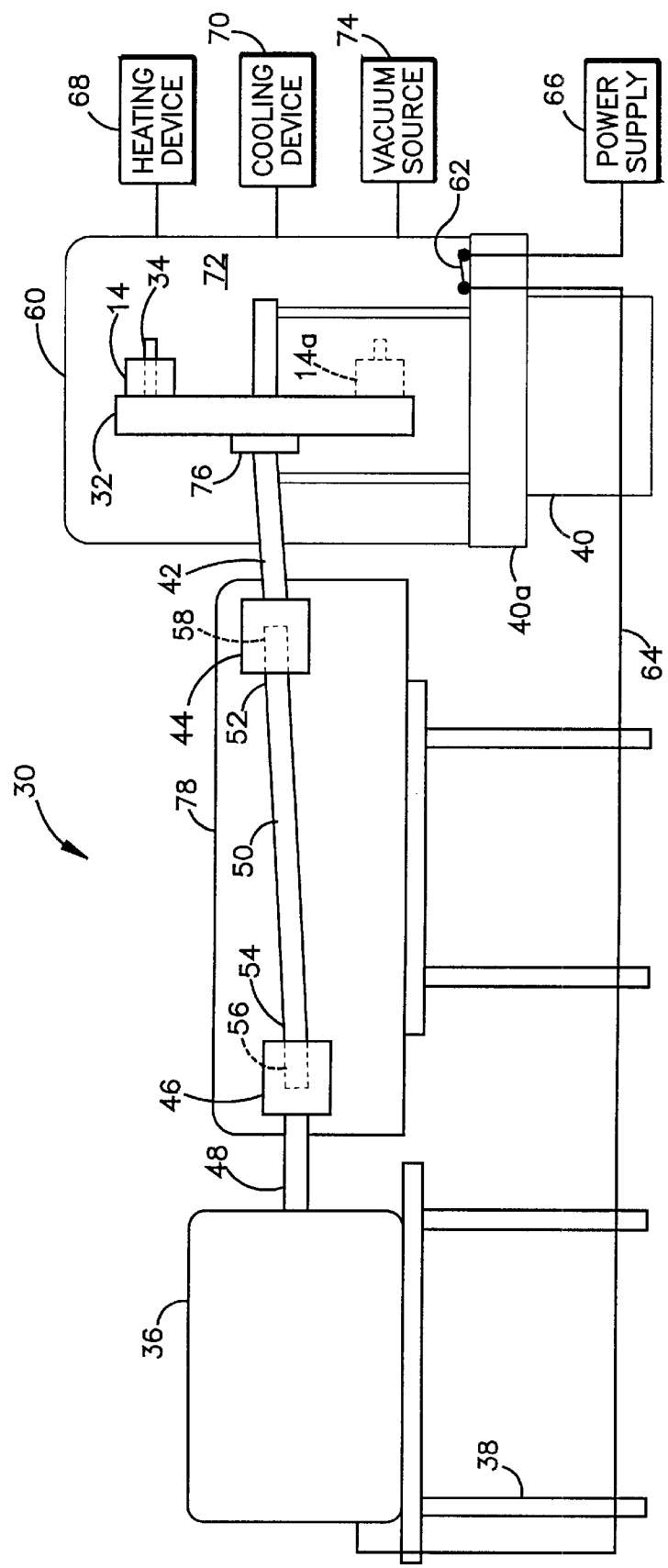
FIG. 3 is a side view of a testing apparatus in accordance with the present invention in an active state.

With reference now to FIGS. 2 and 3, an apparatus 30, in accordance with the present invention, is shown for testing an object, such as the monitoring unit 14 of FIG. 1 under various operating conditions. The apparatus 30 allows the monitoring unit 14 to be tested under conditions similar to, and in some cases in excess of, the conditions that the monitoring unit is subjected to when it is actually used in association with a vehicle tire 16. The apparatus 30 allows the operativeness of the tire pressure monitoring unit 14 to be tested in a controlled manner at maximum vehicle speeds while simultaneously being subjected to shock, vibration, temperature and humidity extremes, etc. The apparatus 30 permits this controlled testing of the unit without the expense and difficulty associated with actually operating a vehicle under the same testing conditions.

The apparatus 30 includes a disk 32 upon which the monitoring unit 14 is held. The disk 32 is rotatable to simulate tire rotation. The monitoring unit 14 is held upon the disk 32 in any manner so that it remains fastened to the disk 32 during simulated operating conditions. The monitoring unit 14 may, for example, be clamped, bolted, screwed, riveted, glued, etc. to the disk 32. In the illustrated example, the unit 14 is held to the disk 32 with a pin 34. It is to be appreciated that more than one monitoring unit may be held upon the disk 32 at the same time so that more than one monitoring unit can be tested simultaneously. For instance, in the examples illustrated in FIGS. 2 and 3, a second monitoring unit 14a (shown in phantom) is held upon the disk 32. A drive motor 36 is drivingly connected to the disk 32. The drive motor 36 provides rotational force to rotate the disk 32 and thereby subject the monitoring unit 14 to rotational force (i.e., radial acceleration).

In the exemplary embodiment shown, the motor 36 is rigidly connected with a stationary mount 38. The stationary mount 38 prevents the motor 36 from moving while the motor 36 provides rotational force for the disk 32. A simulating device 40, used to simulate driving conditions, is operatively connected to the disk 32. Specifically, the simulating device 40 moves the disk 32 and the monitoring unit 14 held thereon in three dimensions. In the example shown in FIGS. 2 and 3, the simulating device 40 is illustrated as having a top portion 40a that is operatively connected to the disk 32 via a first connecting shaft 42 (described below). In one example, the simulating device 40 is a vibration generator whose top portion 40a moves to effect vibration of the disk 32. The vibrations generated by the simulating device 40 are representative of conditions under which the unit 14 may be operated when the vehicle 10 is operated on rough terrain, such as when the vehicle is operated on a gravel road. In another example, the simulating device is a noise coil where the top portion 40a induces vibrations in the range of 5–50 Hz, and causes movement of the disk 32 on the order of 10 mm, peak-to-peak. Also, the vibration may be swept through the range, or a part of the range (e.g., 5–31.4 Hz.). It is to be appreciated that the specific example of the vibration generator illustrated in FIGS. 2 and 3 is but one type of suitable vibration generator. It is to be further appreciated that vibration is but one type of inducable movement and that the movement may be much larger than the 10 mm mentioned above.

Turning to the interconnection between the drive motor 36 and the disk 32, the interconnection includes a plurality of shafts and constant velocity joints that isolate the drive motor 36 from transmittal of force caused by the simulating device 40. The interconnection between the drive motor 36 and the disk 32 has the following components in one embodiment. Immediately connected to the disk 32 is a first connecting shaft 42 that connects the disk 32 to the first constant velocity joint 44. As illustrated in FIGS. 2 and 3, the disk 32 may be operatively connected to the connecting shaft 42 through a bearing 76 in a manner known in the art. The motor 36 is connected to a second constant velocity joint 46 through a second connecting shaft 48. A drive shaft 50 interconnects the two constant velocity joints 44, 46. In particular, a first end 52 of the drive shaft 50 is connected to the first constant velocity joint 44 while a second end 54 of the drive shaft 50 is connected to the second constant velocity joint 46.

At least one of the constant velocity joints (e.g., 46) permits axial movement of a shaft connected to the constant velocity joint. In one embodiment, the at least one constant velocity joint (e.g., 46) includes structure to permit a plunging action into and out of the constant velocity joint. This attribute of a constant velocity joint allows longitudinal movement of the shaft toward and away from the joint. In one example, a splined interconnection 56 (shown in phantom) between certain structure (not shown) of one constant velocity joint 46 and the drive shaft 50 is used to facilitate this movement. In the specific example shown in FIGS. 2 and 3, the apparatus 30 is designed to enable the drive shaft 50 to plunge into and out of the second constant velocity joint 46 by the incorporation of splined interconnection 56 between the second end 54 of the drive shaft 50 and the second constant velocity joint 46, and to enable the drive shaft 50 to plunge into and out of the first constant velocity joint 44 by the incorporation of a similar splined interconnection 58 (shown in phantom) between the first end 52 of the drive shaft 50 and the first constant velocity joint 44. It is to be appreciated that although two plunging action constant velocity joints are shown, the apparatus 30 may be configured to have one plunging action constant velocity joint and one non-plunging action constant velocity joint. In other words, only a single longitudinal spline interconnection.

It is to be appreciated that because the disk 32 is drivingly connected to the motor 36 through the first and second constant velocity joints 44, 46, the longitudinal movement allowed by the constant velocity joints permits the disk 32 to move toward and away from the motor 36. Accordingly, the simulating device 40 can act upon the disk 32 and effect movement of the disk 32 both toward and away from the motor 36.

Another attribute of each constant velocity joint is that each constant velocity joint 44, 46 operates to transfer rotational force smoothly from an input shaft (e.g., 48) to the output shaft (e.g., 50) without fluctuations in speed, even at sharp angles between the input and output shafts. Accordingly, as illustrated in FIG. 3, because the disk 32 is connected to the drive shaft 50 through the first constant velocity joint 44, the disk 32 can be rotated at an angle with respect to the drive shaft 50. Additionally, the disk 32 is driven at a constant velocity relative to the velocity of the drive shaft 50. Likewise, because the drive shaft 50 is connected to the motor 36 through the second constant velocity joint 46, the drive shaft 50 can be operated at an angle with respect to the motor 36. Additionally, the drive shaft 50 is driven at a constant velocity relative to the velocity of the motor 36.

It is to be appreciated that the driving interconnection between the disk 32 and the motor 36 allows the disk 32 to be operated at an angle with respect to the motor 36 while the motor 36 simultaneously rotates the disk 32 at a constant velocity relative to the velocity of the motor 36. Accordingly, the disk 32 can be moved by the simulating device 40 in three dimensional space while simultaneously being rotated at a constant velocity by the motor 36. This allows the simulating device 40 to subject the rotating disk 32 and the monitoring unit 14 to conditions similar to what the monitoring unit will actually be operated under when the unit 14 is mounted within an automotive tire 16.

As mentioned above, the motor 36 is rigidly fastened to a stationary mount 38. Therefore, the motor 36 and the second connecting shaft 48 connected to the motor 36 are not free to move. They only effect rotation of the disk 32 by spinning the shafts which interconnect the disk 32 to the motor 36. The previously discussed properties of the constant velocity joints 44, 46, however, damp the actions of the simulating device 40 from being transferred back to the motor 36. The disk 32 and monitoring unit 14 can, therefore, be subjected to testing conditions such as extreme vibration and shock by the simulating device 40 without affecting the drive motor 36. It is to be appreciated that the degree of deflection of the component parts of the present invention as illustrated in FIG. 3 may be exaggerated from the degree of deflection of the parts during an actual simulation. FIG. 3 is merely meant to be an exemplary illustration of how the parts may move with respect to one another. It may not necessarily be reflective of the actual degree of movement of the parts, however, during various simulations.

Preferably, the disk 32 of the apparatus 30 is smaller than the size of an average automotive tire. A typical automotive tire 16 is approximately 20 inches in diameter. The disk 32 preferably has a diameter on the order of about 5 to 14 inches and preferably about 8 inches. Also, the disk 32 is preferably about one half of an inch thick.

It is known that the kinetic energy of an object is a function of the mass of the object. In particular, the kinetic energy of an object increases in proportion to an increase in the mass of the object. Because the disk is smaller than a typical automotive tire, the disk 32 has a smaller mass than an average automotive tire 16. Accordingly, because the disk 32 is less massive than an automotive tire, the rotating disk 32 has a smaller kinetic energy than the average rotating automotive tire 16. The kinetic energy of an average rotating automotive tire 16 is typically on the order of about 15 times greater than the kinetic energy of the disk 32, when the disk is rotated at a rotational velocity sufficient to angularly accelerate the monitoring unit 14 at an angular acceleration similar to what the unit 14 would experience if the unit were mounted within the automotive tire 16. The lower kinetic energy of the disk 32 simplifies the testing process and lowers costs while increasing testing safety. Additionally, the smaller sized disk allows the use of lower capacity shock and vibration equipment (e.g. a smaller simulating device 40) to expose the tire pressure monitoring unit 14 to conditions representative of actual operating conditions.

In the examples illustrated in FIGS. 2 and 3, the apparatus 30 has a cover 60 that selectively covers the disk 32. The cover 60 may be a scatter shield that prevents debris from encroaching upon or being directed away from the disk 32 and test unit 14. In one example, the scatter shield is formed out of a sheet of durable plastic material.

A switch 62 that is selectively switched when the cover 60 is fully situated over the disk 32 may be included to render the apparatus 30 inactive when the disk is not covered by the cover 60. For example, in the embodiment shown in FIG. 2, the switch 62 may be biased to an open position which opens a circuit 64 (shown schematically) and cuts power from power supply 66 to the motor 36 when the cover 60 does not close the switch. This effectively prevents the motor 36 from spinning the disk 32 when the cover 60 is not fully situated over the disk 32.

However, as illustrated in FIG. 3, when the cover 60 is fully situated over the disk 32, the switch 62 is closed and the circuit 64 is completed. Power is then supplied to the motor 36 by the power supply 66 and the apparatus can be actuated. A second cover 78 may be included to selectively cover the drive shaft 50 and/or constant velocity joints 44, 46. A similar switching arrangement (not shown) can be implemented with the second cover 78 to likewise disable the apparatus 30 when the second cover is not fully situated over the drive shaft 50 and/or contact velocity joints 44, 46. Additionally, it is to be appreciated that such switching arrangements can similarly be configured to enable and disable the simulating device 40.

As an alternative, or an addition, to the simulating device 40, heating 68 and/or cooling 70 devices could be operatively associated with the disk 32 to respectively heat and/or cool the unit to simulate temperature extremes that the tire pressure monitoring unit 14 may be subjected to when the unit 14 is actually mounted within an automotive tire. One skilled in the art can appreciate that another operating condition can be simulated by adjusting the pressure around the monitoring unit 14. The pressure may easily be controlled by simply creating a vacuum chamber around the disk 32. This may be accomplished, for example, by sealing the cover 60 so that it is substantially airtight. Airflow into and out of the chamber 72 created by the cover 60 can then be controlled by a vacuum source 74 connected to the cover 60. Activating the vacuum source 74 reduces the pressure within the chamber 72 while reversing the vacuum source increases the pressure within the chamber. Thus, the monitoring unit 14 can be tested under high pressures such as may be encountered at low altitudes as well as under low pressures as may be encountered at higher altitudes. If the unit 14 is tested when the chamber 72 created by the cover 60 is not air tight and is not pressurized or depressurized, then, provided the unit 14 is functioning properly, the display 18 should indicate that the unit 14 senses ambient atmospheric pressure.

A method of testing an automotive tire-mounted device, such as the tire pressure monitoring unit 14, includes the steps of locating the test unit 14 on the disk 32, holding the test unit 14 on the disk 32, interconnecting the drive motor 36 to the disk 32, starting the drive motor 36, rotating the disk 32 with the drive motor 36 and moving the unit 14 in three dimensional space without affecting the motor 36. The method may also include the step of sizing the disk 32 such that the disk 32 has a kinetic energy significantly less than the kinetic energy of a rotating automotive tire 16 when the rotating disk 32 is rotated by the motor at a rotational velocity sufficient to accelerate the unit 14 at a radial acceleration similar to the radial acceleration that the unit would experience if mounted on the rotating automotive tire 16.

From the above description of the invention, those skilled in the art will perceive improvements, changes and modifications. Such improvements, changes and modifications are intended to be included within the scope of the appended claims.

Having described the invention, the following is claimed:

1. An apparatus for testing units that are to be subject to rotation force, said apparatus comprising:
   a rotational drive motor;
   a rotating member;
   a drive interconnection operatively connected between said drive motor and said rotating member, said drive interconnection including:

a first constant velocity joint;
a longitudinal spline interconnection; and
a second constant velocity joint;
a stationary motor mount fixed to said drive motor;
a test unit holder located on said rotating member for supporting a test unit; and
a three-dimensional motion drive operatively connected to said rotating member.

2. An apparatus as set forth in claim 1, wherein said test unit holder is a first test unit holder, and said apparatus including a plurality of test unit holders located on said rotating member.

3. An apparatus as set forth in claim 1, wherein said test unit holder is located on said rotating member at a first radius, and wherein the test unit when mounted within an automotive tire is at a second radius, said first radius being smaller than said second radius.

4. An apparatus as set forth in claim 1, wherein said first constant velocity joint and said second constant velocity joint are operatively connected by a drive shaft having said spline interconnection.

5. An apparatus as set forth in claim 1, wherein the test unit is a tire condition monitoring unit, and said three-dimensional motion drive including a pressure vessel enclosing said test unit holder and the tire condition monitoring unit.

6. An apparatus as set forth in claim 5, said pressure vessel also enclosing said rotating member.

7. An apparatus as set forth in claim 1, including a heating device that heats the test device.

8. An apparatus as set forth in claim 1, wherein said test unit holder is located at about an 8-inch radius on said rotating member.

9. An apparatus as set forth in claim 1, wherein said rotating member is sized such that said rotating member has a kinetic energy significantly less than the kinetic energy of a rotating automotive tire when said rotating member is rotated by said drive motor at a rotational velocity sufficient to accelerate the test unit at a radial acceleration similar to the radial acceleration that the test unit would experience if mounted on the rotating automotive tire.

10. An apparatus as set forth in claim 1, wherein said rotating member, said test unit holder, and the test unit are enclosed within a scatter shield.

11. An apparatus for testing automotive tire-mounted units, said apparatus comprising:
means for rotationally supporting a test unit;
means for rotating said means for rotationally supporting;
means for moving said means for rotationally supporting in three dimensional space; and
means for operatively connecting said means for rotating to said means for rotationally supporting without transferring force from said means for moving to said means for rotating.

12. An apparatus as set forth in claim 11, wherein said means for rotationally supporting includes means for holding the test unit at a radius smaller than the radius of a tire-mounted location for the unit.

13. An apparatus as set forth in claim 12, wherein said means for rotating causes radial acceleration of the test unit similar to the radial acceleration the test unit would experience if rotated at the radius of a tire-mounted location.

14. A method for testing automotive tire-mounted units, said method comprising the steps of:
locating a test unit on a member;
holding the test unit on the member;
operatively connecting a drive motor through at least one constant velocity joint and a splined interconnection to the member;
starting the drive motor;
rotating the member with the drive motor; and,
moving the test unit in three dimensional space using a simulating device without affecting the drive motor.

15. A method as set forth in claim 14, further comprising the steps of:
enclosing the test unit in a pressure chamber; and,
subjecting the test unit to pressure changes.

16. A method as set forth in claim 14, further comprising the step of:
heating the test unit.

17. A method as set forth in claim 14, further comprising the step of:
cooling the test unit.

18. A method as set forth in claim 14, further comprising the step of:
enclosing the test unit within a scatter shield.

19. A method as set forth in claim 14, further comprising the step of:
locating the test unit on the member at a radius smaller than the radius of an automotive tire-mounted location for the unit.

20. A method as set forth in claim 14, further comprising the step of:
sizing the member such that the member has a kinetic energy significantly less than the kinetic energy of a rotating automotive tire when the rotating member is rotated by the drive motor at a rotational velocity sufficient to accelerate the test unit at a radial acceleration similar to the radial acceleration that the test unit would experience if mounted on the rotating automotive tire.

* * * * *